May 9, 1950     G. FASSIN     2,506,863
CAMERA CASING HAVING SELECTIVE COVER LATCHING MEANS
Filed May 3, 1947     2 Sheets-Sheet 1
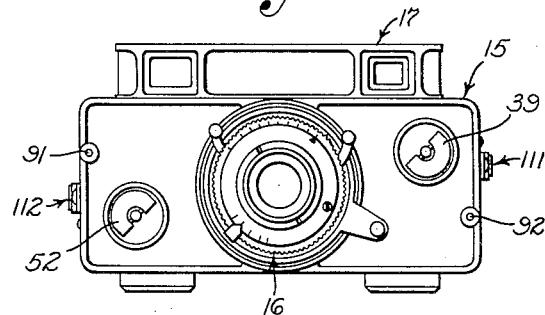
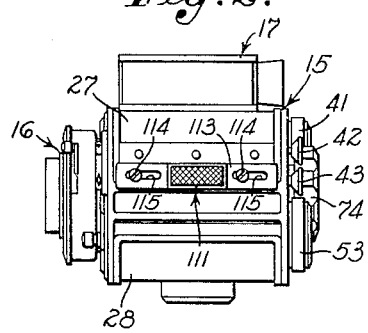
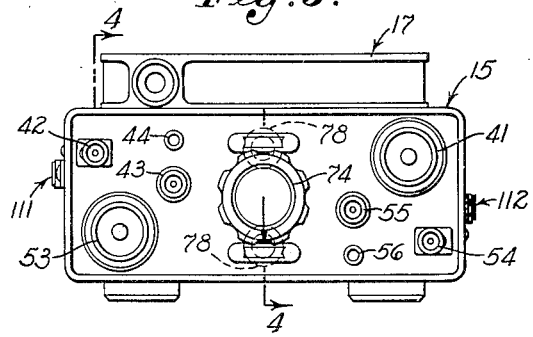
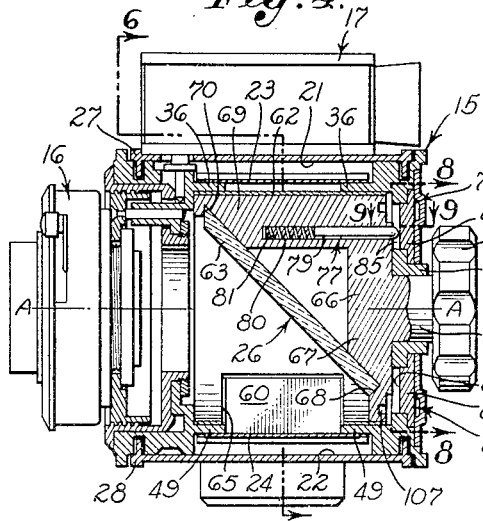
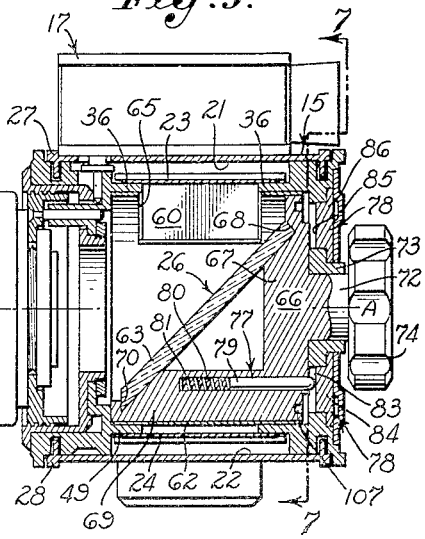
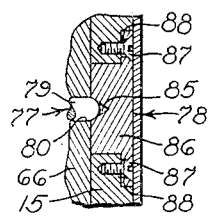
INVENTOR.
GUSTAVE FASSIN
BY HIS ATTORNEYS.
HARRIS, KIECH, FOSTER & HARRIS May 9, 1950 G. FASSIN 2,506,863
CAMERA CASING HAVING SELECTIVE COVER LATCHING MEANS
Filed May 3, 1947 2 Sheets-Sheet 2
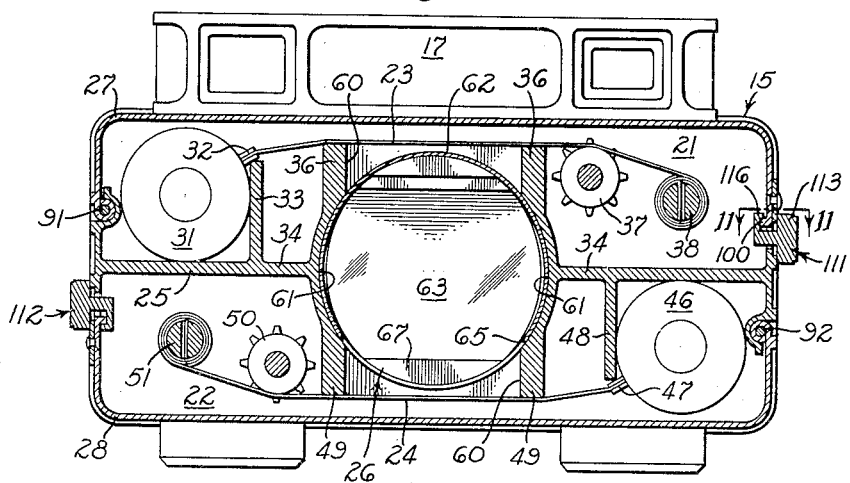
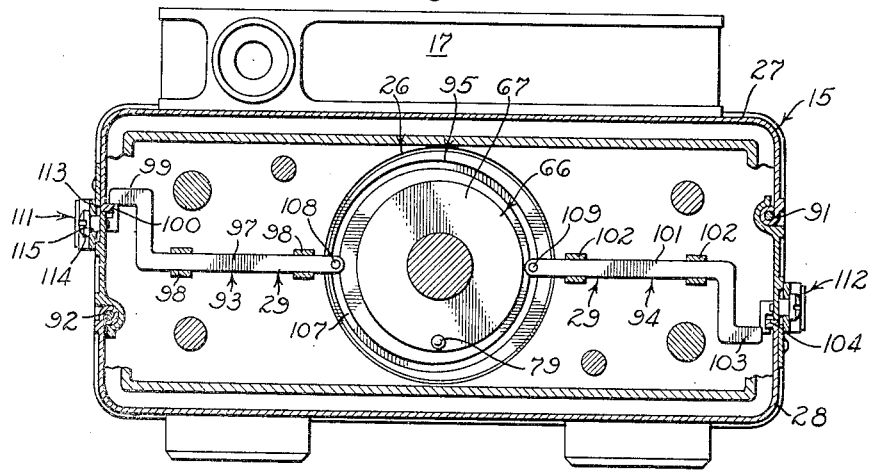
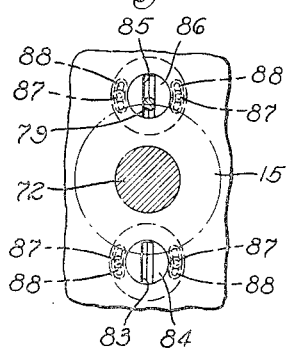
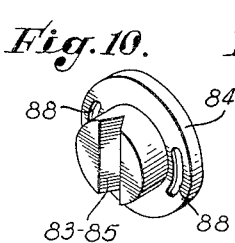
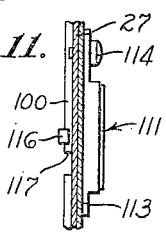
INVENTOR.
GUSTAVE FASSIN
BY HIS ATTORNEYS.
HARRIS, KIECH, FOSTER & HARRIS Patented May 9, 1950

2,506,863

UNITED STATES PATENT OFFICE 2,506,863

CAMERA CASING HAVING SELECTIVE COVER LATCHING MEANS

Gustave Fassin, Los Gatos, Calif., assignor to Adel Precision Products Corp., Burbank, Calif., a corporation of California Application May 3, 1947, Serial No. 745,762

5 Claims. (Cl. 95—11)

My invention relates in general to cameras and, more particularly, to a camera which is capable of exposing either of two films individually, the term "film" being employed generically herein to designate any photosensitive material.

A primary object of the invention is to provide a camera which is adapted to receive two films, e. g., black and white film and color film, and which includes means for selectively projecting the image to be reproduced onto either film. More specifically, a primary object of my invention is to provide a camera having two film compartments and having means for selectively admitting light into either compartment so as to expose the film therein.

Another object of the invention is to provide a camera including a rotatable light deflecting device, such as a mirror, which is adapted to project light admitted by an objective onto either film depending upon the position of the device.

An important object is to provide a rotatable mount for the light deflecting device which completely shields one of the films while the other is being exposed.

A further object of the invention is to provide a camera wherein the two films are located in a parallel planes equidistant from the optical axis of the objective to eliminate any necessity for a change in focus when exposing first one film and then the other.

Still another object of the invention is to provide means for accurately establishing the operative positions of the light deflecting device so as to insure precise orientation of the projected light rays with respect to the film being exposed.

An important object of my invention is to provide a camera having covers for the two film compartments which cannot be opened simultaneously, the cover of the film compartment toward which the light deflecting device is directed preferably being locked to prevent damage to the device. A related object is to provide a camera wherein the position of the light deflecting device determines which cover is locked.

An additional object of the invention is to provide a camera for selectively exposing two films which is of substantially the same size as comparable single film cameras.

The foregoing objects of my invention and the advantages suggested thereby, together with various other objects and advantages which will be evident hereinafter, may be realized by means of the exemplary embodiment illustrated in the accompanying drawings and described in detail hereinafter. Referring to the drawings:

Figs. 1, 2 and 3 are front, side and rear elevational views, respectively, showing a camera which embodies the fundamental principles of my invention;

Figs. 4 and 5 are enlarged sectional views which are taken along the irregular broken lines 4—4 of Fig. 3 and which show a light deflecting means forming one component of the camera in two diffeernt operative positions.

Figs. 6 and 7 are sectional views which are taken along the broken lines 6—6 and 7—7, respectively, of Figs. 4 and 5, respectively;

Figs. 8 and 9 are further enlarged, fragmentary sectional views which are taken along the broken lines 8—8 and 9—9, respectively, of Fig. 4;

Fig. 10 is an enlarged perspective view of one component of means for establishing the operative positions of the light deflecting means; and Fig. 11 is an enlarged, fragmentary sectional view which is taken along the broken line 11—11 of Fig. 6.

In general, my camera includes a case 15 having an objective 16 and range finder 17 thereon, the objective having the usual focusing means and shutter mechanism (not shown) associated therewith and having means associated therewith for synchronizing the objective and range finder. As best shown in Fig. 6, the case 15 is provided with first and second film compartments 21 and 22 which are adapted to receive roll-type films 23 and 24, respectively, in the particular construction illustrated, the film compartments being separated by an internal structure which is indicated generally by the numeral 25. The camera also includes means indicated generally by the numeral 26 for selectively exposing the films 23 and 24 by projecting light from the objective 16 onto either film individually. The film compartments 21 and 22 are respectively provided with pivoted covers 27 and 28 and the camera includes latch means indicated generally at 29 for preventing simultaneous opening of the two covers.

Considering the structure of the camera in more detail, the unexposed portions of the film 23 in the first film compartment 21 may be contained in a can 31 having the usual rotatable spool (not shown) therein, the film 23 being fed from this can through a slot 32. Rotation of the can 31 may be prevented by a wall 33 which extends perpendicularly from a central, dividing wall 34 forming part of the internal structure 25. The film 23 projecting from the can 31 is trained over spaced walls 36 which support a portion of the film in a predetermined plane for exposure, and is trained over an idling sprocket 37, the exposed film being wound on a spool 38 which may be rotated by means of a winding key 39 as shown in Fig. 1. After all of the film 23 in the compartment 21 has been exposed and wound on the spool 38, it may be returned to the can 31 by means of a re-wind knob 41 which is connected to the spool in the can and which may be located on the back of the camera as shown in Fig. 3. The camera is provided with the usual film release button 42 controlling the spool 38 for the exposed film 23, and is provided with a knob 43 connected to the sprocket 37 for making slight adjustments of the position of the film 23 with respect to the projecting means 26. A suitable counting mechanism (not specifically shown) may be provided, the number of exposures remaining (or made) being visible through a window 44 in the back of the camera.

The winding and control mechanism for the film 24 in the second compartment 22 is similar to that for the film 23 and will not be described in detail. Briefly, the unexposed portions of the film 24 may be contained in a can 46 and may be fed therefrom through a slot 47, rotation of the can being prevented by a wall 48 which extends perpendicularly from the central dividing wall 34. The film 24 is trained over walls 49 which support a portion of the film in a predetermined plane for exposure, and is trained over an idling sprocket 50, the exposed portions of the film being wound on a spool 51 which may be driven by a winding key 52 located on the front of the camera as shown in Fig. 1. A rewind knob 53 is connected to the spool (not shown) in the film can 46 and the camera is provided with a film release button 54 for the spool 51 and with an adjusting knob 55 connected to the sprocket 50. A suitable counting mechanism (not shown) may also be employed for the film 24, the number of exposures being visible through a window 56 in the back of the camera as shown in Fig. 3.

The supporting walls 36 and 49 for the respective films 23 and 24 cooperate to provide a chamber 60 which communicates with the film compartments 21 and 22 and which is adapted to receive the projecting means 26, the walls 36 and 49 being curved, as indicated at 61, to accommodate the projecting means. Referring particularly to Figs. 4, 5 and 6, the projecting means 26, which is of generally cylindrical form, is rotatable in the chamber 60 about an axis A—A which coincides with the optical axis of the objective 16, and includes an opaque sleeve member 62 which fits into and is slidable circumferentially with respect to the curved portions 61 of the chamber 60. The clearance between the sleeve member 62 and the curved portions 61 of the chamber is preferably small so that light cannot filter from one of the compartments 21 or 22 to the other between the sleeve member and the walls of the chamber.

Light entering the interior of the sleeve member 62 from the objective 16 is deflected through an angle of 90° by a light deflecting device which is a plane mirror 63 located at an angle of 45° with respect to the optical axis of the objective in the particular construction illustrated. The mirror 63 projects the light onto either the film 23 or the film 24, the projecting means 26 being rotatable between a first position wherein the mirror projects light from the objective 16 onto the film 23, as shown in Fig. 5, and a second position wherein the mirror projects such light onto the film 24, as shown in Fig. 4, the sleeve member 62 being provided with a window 65 which admits light into one of the film compartments or the other depending upon the position of the projecting means. The window 65, in the particular construction illustrated, is an aperture which communicates with the film compartment 21 when the projecting means 26 is in its first position and which communicates with the film compartment 22 when the projecting means is in its second position as shown in Figs. 5 and 4, respectively.

The mirror 63 is carried by a member of mount 66 which is disposed in the sleeve member 62, the mount including a disc portion 67 which encloses the end of the sleeve member farthest from the objective 16 and which is provided with a groove 68 therein for one edge of the mirror 63, and including an arm portion 69 which is located diametrically opposite the aperture 65 and which is provided with a groove 70 therein for the opposite edge of the mirror. The disc portion 67 of the mount 66 is provided with a shaft 72 which extends through the rear wall of the case 15 and which is journaled in a bearing 73, a knob 74 being mounted on the shaft to permit rotation of the projecting means 26 between its first and second positions by the operator.

It will thus be apparent that by rotating the projecting means 26 into its first or second positions by means of the knob 74, light from the objective 16 may be projected through the aperture 65 in the sleeve member 62 onto either the film 23 or the film 24 so that either film may be exposed at will. The walls 36 and 49 preferably support the portions of the respective films 23 and 24 which are to be exposed in parallel planes equidistant from the optical axis of the objective 16, i. e., equidistant from the point of intersection of the two legs of the light beam from the objective, so that the films 23 and 24 may be exposed successively without any change in focus, this being an important feature of my invention.

Referring now to Figs. 4, 5, 8, 9 and 10, my camera is provided with means 77 for releasably retaining the projecting means 26 in either its first position or its second position, the retaining means preferably adjustable means 78 for accurately establishing such positions so that the projecting means will be oriented relative to the films 23 and 24 with the necessary precision when the projecting means is in its first and second positions, respectively. As best shown in Figs 4 and 5, the retaining means 77 includes a retaining pin 79 which is slidable axially of a bore 80 in the mirror mount 66 and which is biased outwardly by a spring 81 in the bore, the axis of the retaining pin 79 being parallel to the optical axis of the objective 16 and parallel to the axis of rotation A—A of the projecting means 26 in the particular construction illustrated. The outer end of the retaining pin 79 is insertable into a V-shaped groove 83 in a retaining member 84 when the projecting means 26 is in its first position as shown in Fig. 5, and being insertable into a similar groove 85 in a retaining member 86 when the projecting means is in the second position as shown in Fig. 4. The retaining members 84 and 86 are rotatable relative to the case 15 about axes which are parallel to but spaced frame the axis of the retaining pin 79 when the projecting means 26 is in its first and second positions, respectively. Thus, by rotating the retaining members 84 and 86 slightly, the angle of the grooves 83 and 85 therein with respect to the case 15 may be changed to permit accurate adjustments of the first and second positions of the projecting means 26, the retaining members preferably being secured to the case 15 in their adjusted positions by screws 87 which extend through arcuate slots 88 in the retaining members as best shown in Figs. 8 to 10. The eccentricity of the axes of rotation of the retaining members 84 and 86 with respect to the axis of the retaining pin 79 is preferably relatively small so that relatively large angular movements of the retaining members are required to vary the first and second positions of the projecting means 26 appreciably, whereby very accurate adjustments of such positions may be made.

In order to protect the surface of the mirror 63 when film is being placed in or removed from the compartments 21 and 22, and in order to prevent accidental exposure of film in one of the compartments while film is being placed in or being removed from the other compartment, I prefer to incorporate in my camera the aforementioned latch means 29 for preventing simultaneously opening of the covers 27 and 28. As best shown in Fig. 7, the covers 27 and 28 are pivoted to the case 15 at 91 and 92, respectively, and are movable relative to the case between open and closed positions. The camera is provided with first latch means 93 which is movable relative to the case 15 between operative and inoperative positions and which is engageable with the cover 27 when in its operative position to retain this cover in its closed position. Similarly, the camera is provided with second latch means 94 which is also movable relative to the case 15 between operative and inoperative positions and which is engageable with the cover 28 when in its operative position so as to retain this cover in its closed position. The latch means 93 and 94 are controlled by eccentric actuating means 95 in such a manner that the cover 27 is locked when the projecting means 26 is in its first position, i. e., when the mirror 63 faces the film compartment 21, and in such a manner that the cover 28 is locked when the projecting means is in its second position, i. e., when the mirror faces the film compartment 22. The operation of the latch means 93 and 94 is also controlled by the eccentric actuating means 95 in such a manner that the cover 27 is released when the mirror 63 faces the cover 28, and the cover 28 is released when the mirror 63 faces the cover 27. Thus, when film is being removed from or placed in the compartment 21, for example, the mirror faces the compartment 22 and the cover 28 for the compartment 22 is locked so that the surface of the mirror cannot be damaged and so that accidental exposure of the film in the compartment 22 is prevented.

Considering the structures of the latch means 93 and 94 in more detail and referring particularly to Fig. 7, the first latch means 93 includes a reciprocable latch member which is slidable relative to the case between operative and inoperative positions in guides 98, the member 97 having an arm 99 which engages a flange 100 on the cover 27 when the latch member is in its operative position so as to retain the cover 27 in its closed position. Similarly, the latch means 94 includes a reciprocable latch member 101 which is slidable between operative and inoperative positions in guides 102 carried by the case 15 and which is provided with an arm 103 that is adapted to engage a flange 104 on the cover 28 to retain this cover in its closed position when the latch member 101 is in its operative position. It will be noted that the latch members 97 and 101 are shown in their respective operative and inoperative positions in Fig. 7.

The actuating means 95 comprises an eccentric annular groove 107 in the outer surface of the disc portion 67 of the mirror mount 66, the latch members 97 and 101 being provided with followers 108 and 109, respectively, thereon which are disposed in the eccentric groove. The eccentricity of the annular groove 107 is such that the latch members 97 and 101 are in their operative and inoperative positions, respectively, when the projecting means 26 is in its first position so that the cover 27 is latched whenever the mirror 63 is turned in its direction. Similarly, the eccentricity of the groove 107 is such that the respective latch members 97 and 101 are in their inoperative and operative positions when the projecting means 26 is in its second position so that the cover 28 is latched when the mirror 63 faces this cover. Thus, each of the covers 27 and 28 can be opened only when the mirror 63 faces in the opposite direction, thereby protecting the mirror surface from dust or accidental contact by the fingers of the operator. It will be noted that since the eccentric groove 107 which controls the operation of the latching members 97 and 101 is formed in the mirror mount 66, the cover toward which the mirror 63 is directed is always locked automatically, the other cover being unlocked.

As best shown in Figs. 2, 6 and 11, the covers 27 and 28 are also provided with manually releasable latches 111 and 112, respectively, which retain the covers in their closed positions independently of the latch means 29. The latch 111 includes a slidable latch member 113 which is secured to the case 15 by screws 114 extending through slots 115 in the latch member as best shown in Fig. 2, the latch member 113 being provided with an arm 116 thereon which hooks over the previously discussed flange 100 on the cover 27. The flange 100 is provided with a notch 117 therein through which the arm 116 of the latch member 113 may pass when the latch is moved to released position so as to permit opening the cover 27. The latch 112 for the cover 28 is of similar construction and will not be described in detail.

It will thus be apparent that I have provided a camera which may be employed to selectively expose two spaced, parallel films 23 and 24 by admitting light from the objective 16 into either the film compartment 21 or the film compartment 22. Thus, a single camera may be employed to carry two films of different characteristics, e. g., black and white film and color film, thereby avoiding any necessity for changing the film in the camera whenever a film having different characteristics is desired, and avoiding any necessity for carrying two cameras. Moreover, it will be apparent that I have provided a two film camera which is of substantially the same size as a comparable single film camera.

Although I have disclosed a specific embodiment of my invention herein for illustrative purposes, it will be understood that various changes, modifications and substitutions may be incorporated in this embodiment without departing from the spirit of the invention. Accordingly, I hereby reserve the right to all such changes, modifications and substitutions as properly come within the scope of the invention as set forth in the appended claims.

I claim as my invention:

1. A camera including: a case provided with first and second covers each of which is movable between open and closed positions; first latch means movable relative to said case between operative and inoperative positions and engageable with said first cover when in said operative position for retaining said first cover in its closed position; second latch means movable relative to said case between operative and inoperative positions and engageable with said second cover when in said operative position for retaining said second cover in its closed position; and actuating means including an eccentric operatively connected to said first latch means and said second latch means for moving same between their respective operative and inoperative positions, said actuating means being adapted to move one of said latch means toward its operative position while simultaneously moving the other of said latch means toward its inoperative position.

2. In a camera of the character described, the combination of: a case provided with first and second covers each of which is movable between open and closed positions; a first latch member which is reciprocably relative to said case between operative and inoperative positions and which is engageable with said first cover when it is in its operative position to retain said first cover in its closed position; a second latch member which is reciprocable relative to said case between operative and inoperative positions and which is engageable with said second cover when it is in its operative position to retain said second cover in its closed position; and actuating means including an eccentric operatively connected to said first and second latch members for simultaneously moving said first and second latch members toward their operative and inoperative positions, respectively, and for simultaneously moving said first and second latch members toward their respective inoperative and operative positions.

3. A camera as set forth in claim 2 wherein said actuating means includes a rotatable member having an eccentric annular groove therein, each of said latch members being provided with a follower which is disposed in said groove.

4. In a camera for selectively exposing two films, the combination of: a case provided with first and second film compartments and provided with first and second covers for the respective compartments, each of said covers being movable between open and closed positions; means for admitting light into said case; means rotatable relative to said case between first and second positions for selectively projecting such light into said first compartment when in said first position and into said second compartment when in said second position; first latch means movable between operative and inoperative positions and engageable with said first cover when in its operative position for retaining said cover in its closed position; second latch means movable between operative and inoperative positions and engageable with said second cover when in its operative position for retaining said second cover in its closed position; and eccentric means connected to and rotatable with said projecting means and operatively connected to said first and second latch means for moving said first and second latch means toward their respective operative and inoperative positions during rotation of said projecting means toward its first position and for moving said first and second latch means toward their respective inoperative and operative positions during movement of said projecting means toward its second position.

5. A camera as defined in claim 4 wherein said eccentric means comprises a disc having an annular groove therein which is eccentric with respect to the axis of rotation of said projecting means and wherein each of said latch means comprises a reciprocable latch member having a follower extending into said groove.

GUSTAVE FASSIN.

REFERENCES CITED

The following references are of record in the file of this patent:

UNITED STATES PATENTS

| Number | Name | Date |
|---|---|---|
| 634,881 | Dallmeyer | Oct. 17, 1899 |
| 1,368,863 | Turner | Feb. 15, 1921 |
| 1,527,476 | Geanetto | Feb. 24, 1925 |
| 1,884,733 | Kindelmann et al. | Oct. 25, 1932 |
| 1,990,439 | Murphy | Feb. 5, 1935 |
| 2,245,606 | Rauch | June 17, 1941 |
| 2,315,284 | Thompson | Mar. 30, 1943 |
| 2,384,655 | Stewart | Sept. 11, 1945 |
| 2,396,869 | McDonald, Jr., et al | Mar. 19, 1946 |

FOREIGN PATENTS

| Number | Country | Date |
|---|---|---|
| 656,624 | Germany | Feb. 12, 1938 |
| 707,146 | Germany | June 14, 1941 |